United States Patent
Zhang et al.

(10) Patent No.: US 10,264,000 B2
(45) Date of Patent: Apr. 16, 2019

(54) MALICIOUS WEBSITE ACCESS METHOD AND APPARATUS

(71) Applicant: TENCENT TECHNOLOGY (SHENZHEN) COMPANY LIMITED, Shenzhen (CN)

(72) Inventors: Hui Zhang, Shenzhen (CN); Yang Li, Shenzhen (CN); Fudong Shao, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 70 days.

(21) Appl. No.: 14/829,255

(22) Filed: Aug. 18, 2015

(65) Prior Publication Data

US 2015/0358342 A1 Dec. 10, 2015

Related U.S. Application Data

(63) Continuation of application No. PCT/CN2013/087551, filed on Nov. 21, 2013.

(30) Foreign Application Priority Data

Feb. 21, 2013 (CN) .......................... 2013 1 0055664

(51) Int. Cl.
- *H04L 29/06* (2006.01)
- *H04L 29/08* (2006.01)
- *G06F 21/51* (2013.01)

(52) U.S. Cl.
CPC .......... *H04L 63/1416* (2013.01); *G06F 21/51* (2013.01); *H04L 63/145* (2013.01); *H04L 63/1441* (2013.01); *H04L 67/02* (2013.01)

(58) Field of Classification Search
CPC ............. H04L 63/1416; H04L 63/1441; H04L 63/145; H04L 67/02

(Continued)

(56) References Cited

U.S. PATENT DOCUMENTS

| | | | |
|---|---|---|---|
| 2006/0095955 A1* | 5/2006 | Vong | H04L 63/101 726/3 |
| 2007/0074125 A1 | 3/2007 | Platt et al. | |

(Continued)

FOREIGN PATENT DOCUMENTS

| | | |
|---|---|---|
| CN | 101102255 A | 1/2008 |
| CN | 101273347 A | 9/2008 |

(Continued)

OTHER PUBLICATIONS

Falguni, "E-SPY: Detection and Prediction of Website Attacks", Feb. 2018, International Journal of Advanced Research in Computer Science, p. 315-322 (Year: 2018).*

(Continued)

*Primary Examiner* — Kenneth W Chang
*Assistant Examiner* — Gregory A Lane
(74) *Attorney, Agent, or Firm* — Oblon, McClelland, Maier & Neustadt, L.L.P.

(57) ABSTRACT

A malicious website access method and apparatus are provided. The method includes: determining whether a website is a malicious website; and acquiring a non-executable preview interface of a web page of the malicious website for a terminal to display, if the website is a malicious website. A user may view, through a non-executable preview interface, information about a website to be accessed by the user. Moreover, because a terminal does not access a malicious website directly, the terminal is not exposed to malicious websites, thereby enhancing security of the terminal.

12 Claims, 6 Drawing Sheets

(58) Field of Classification Search
USPC .............................................. 726/23; 706/47
See application file for complete search history.

(56) References Cited

U.S. PATENT DOCUMENTS

| | | | |
|---|---|---|---|
| 2009/0070873 A1 | 3/2009 | McAfee et al. | |
| 2009/0320131 A1* | 12/2009 | Huang | H04L 29/12066 726/23 |
| 2010/0058468 A1* | 3/2010 | Green | G06F 21/51 726/22 |
| 2010/0064018 A1 | 3/2010 | Luo | |
| 2011/0022559 A1* | 1/2011 | Andersen | G06F 17/30905 706/47 |
| 2011/0185271 A1* | 7/2011 | Aciicmez | G06F 21/563 715/234 |
| 2011/0185427 A1* | 7/2011 | Aciicmez | G06F 21/53 726/24 |
| 2011/0191849 A1* | 8/2011 | Jayaraman | H04L 63/1416 726/23 |

FOREIGN PATENT DOCUMENTS

| | | |
|---|---|---|
| CN | 101620620 A | 1/2010 |
| CN | 101827104 | 9/2010 |
| CN | 102394838 A | 3/2012 |
| CN | 102663319 | 9/2012 |
| CN | 102855320 | 1/2013 |
| WO | WO 02/37307 A1 | 5/2002 |

OTHER PUBLICATIONS

Office Action dated May 26, 2016 for Chinese Application No. 201310055664.3, 8 pages.
International Search Report issued in corresponding application PCT/CN2013/087551, dated Feb. 27, 2014, pp. 1-7.
Office Action dated Mar. 30, 2017 for Chinese Application No. 201310055664.3, 8 pages.

* cited by examiner

MALICIOUS WEBSITE ACCESS METHOD AND APPARATUS

RELATED APPLICATION

This application is a continuation of PCT/CN2013/087551, filed on Nov. 21, 2013, which claims priority to Chinese Patent Application No. 201310055664.3, filed with the Chinese Patent Office on Feb. 21, 2013 and entitled "MALICIOUS WEBSITE ACCESS METHOD, APPARATUS, AND SYSTEM", which are incorporated herein by reference in their entireties.

FIELD OF THE TECHNOLOGY

The present disclosure relates to the field of communications technologies, and in particular, to a malicious website access method and apparatus.

BACKGROUND OF THE DISCLOSURE

A malicious website may be presented in various forms, such as a phishing website and a web page virus. The web page virus is a virus that causes damage through a web page. The web page virus exists in a web page and uses malicious codes written in certain program languages to embed a virus due to software vulnerability. When a user logs on to or visits some websites containing web page viruses, the web page viruses are activated secretly. Once activated, these viruses can use resources of a system of a terminal to cause harm to the system. At best, a user's information may be modified, titles of a home page and a browser of the user may be changed; at worst, many functions of a system can be closed, the Trojan horse is installed, and a virus is embedded, thereby adversely affecting the normal function a computer system. In a severe situation, the computer system can be re-formatted. Moreover, such a web page virus can be easily written and revised. Therefore, it is very difficult for a user to track the web page virus and guard against the web page virus.

SUMMARY

Embodiments of the present disclosure provide a malicious website access method and apparatus, to solve at least one of the foregoing problems.

An embodiment of the present disclosure provides a malicious website access method, including:

determining whether a website is a malicious website; and acquiring a non-executable preview interface of a web page of the malicious website for a terminal to display, if the website is a malicious website.

An embodiment of the present disclosure provides another malicious website access method, including:

querying a database by using an identifier of a malicious website from a terminal, to obtain a non-executable preview interface of the malicious website; and sending the non-executable preview interface to the terminal.

An embodiment of the present disclosure provides a malicious website access apparatus, including one or more processors and a memory having processor-executable instructions stored therein, and the instructions when executed by the one or more processors, configure the apparatus to:

determine whether a website is a malicious website; and acquire a non-executable preview interface of a web page of the malicious website for a terminal to display, if the website is a malicious website.

A malicious website access apparatus, including one or more processors and a memory having processor-executable instructions stored therein, and the instructions when executed by the one or more processors, configure the apparatus to:

query a database by using an identifier of a malicious website from a terminal, to obtain a non-executable preview interface of the malicious website; and send the non-executable preview interface to the terminal.

It can be seen from the foregoing technical solutions that, the embodiments of the present disclosure have the following advantages: A user may view information about a to-be-accessed website through a non-executable preview interface; moreover, because a terminal does not access a malicious website directly, the terminal is secure, which can improve security of the terminal.

DESCRIPTION OF EMBODIMENTS

To make the technical solutions and advantages of the present disclosure clearer, the present disclosure is further described in detail below with reference to the accompanying drawings. Apparently, the described embodiments are merely some of the embodiments of the present invention rather than all of the embodiments. All other embodiments obtained by a person of ordinary skill in the art based on the embodiments of the present disclosure without creative efforts shall fall within the protection scope of the present disclosure.

Figure 1:
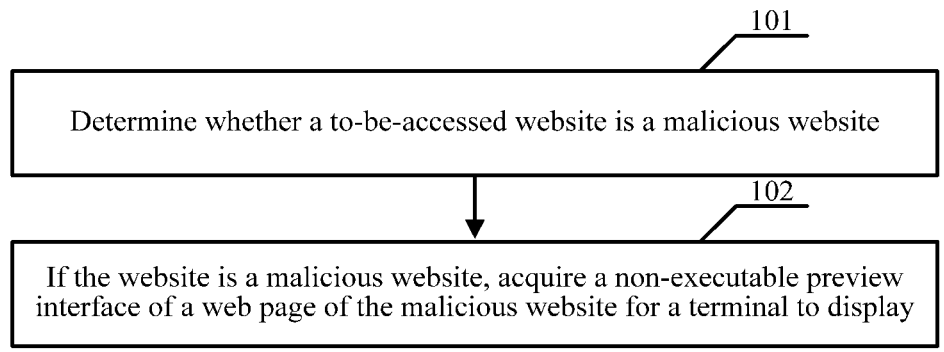
FIG. 1 is a schematic flowchart of a malicious website access method according to an embodiment of the present disclosure.

An embodiment of the present disclosure provides a malicious website access method. As shown in FIG. 1, the method may be implemented on a terminal, and includes step 101 to step 102.

Step 101 may include determining whether a website is a malicious website.

When the terminal intends to access a website, for example, by inputting information such as a URL of the website, and before the terminal accesses the website, the URL corresponding to the website may be intercepted and the contents of the website may be previewed to determine whether a website is a malicious website. The determination of whether the website is a malicious website may be performed according to a method similar to what is used by existing security software in determining a malicious website. The determination of whether a website is a malicious website can be performed using other methods and is not limited to the method disclosed in this embodiment of the present disclosure.

Step 102 may include acquiring a non-executable preview interface of a web page of the malicious website for the terminal to display, if the website is a malicious website.

In this embodiment, a user may preview, through a non-executable preview interface, information about a website to be accessed by a terminal. Moreover, because the terminal does not access a malicious website directly, the terminal is not exposed to the malicious website, thereby enhancing security of the terminal.

The foregoing non-executable preview interface may be a preview interface capable of displaying a web page of a malicious website. In addition, the preview interface, generally, is not an executable file. There may be many presentation forms of the preview interface and a common presentation form may be that the foregoing non-executable preview interface is a preview picture. A presentation form of the non-executable preview interface is not limited in this embodiment of the present disclosure.

This embodiment of the present disclosure further provides a warning solution. If the website is a malicious website, the method further includes: issuing a warning that the website is a malicious website.

This embodiment of the present disclosure further provides a solution that a user chooses whether to access the malicious website. The foregoing method further includes:

when the warning that the website is a malicious website is issued, displaying, by the terminal, selection keys of "stop accessing", "continue accessing", and "preview securely"; and if a user selects the "preview securely", executing the acquiring a non-executable preview interface of a web page of the malicious website, and displaying the non-executable preview interface.

It should be noted that, a presentation form of the "continue accessing" may be a button for querying whether to view the preview interface of the web page, and the "continue accessing" may also be in another presentation form as long as it indicates that a user intends to continue viewing the web page of the website. A specific presentation form of the "continue accessing" does not affect implementation of this embodiment of the present disclosure, and is not limited in this embodiment of the present disclosure.

This embodiment of the present disclosure further provides an optional solution of acquiring a non-executable preview interface, for example, the acquiring a non-executable preview interface of a web page of the malicious website includes: sending, by the terminal, an identifier of the malicious website to a server, and receiving a non-executable preview interface corresponding to the identifier returned by the server.

In a solution that a non-executable preview interface of a malicious website is acquired by using a server, centralized management for non-executable preview interfaces of malicious websites may be achieved. In this way, there is no need to generate a non-executable preview interface each time when each terminal accesses a malicious website, which can improve utilization of system resources.

Figure 2:
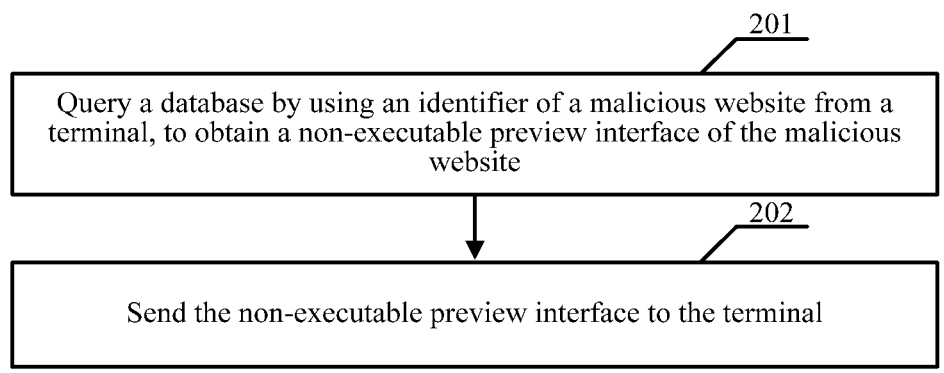
FIG. 2 is a schematic flowchart of a malicious website access method according to an embodiment of the present disclosure.

The identifier of the malicious website may include information about a web address of the malicious website. The solution may help a server to generate a non-executable preview interface in a case in which there is no non-executable preview interface of the malicious website in a database. A second embodiment of the present disclosure provides another malicious website access method. As shown in FIG. 2, the method may be implemented in a server on a network side, and includes step 201 to step 202.

Step 201 may include querying a database by using an identifier of a malicious website from a terminal, to obtain a non-executable preview interface of the malicious website.

A database possibly does not include the non-executable preview interface of the malicious website. Therefore, step 201 may further include: if there is no non-executable preview interface corresponding to an identifier of the malicious website in the database, acquiring a web address of the malicious website by using the identifier of the malicious website, and generating, by using the web address, a non-executable preview interface corresponding to the website; and then, sending the non-executable preview interface to the terminal.

It may be understood that, after the non-executable preview interface corresponding to the website is generated, the non-executable preview interface may be stored into the database, thereby facilitating the next query.

Step 202 may include sending the non-executable preview interface to the terminal.

In this embodiment, a user may view, through a non-executable preview interface, information about a website to be accessed by the user. Moreover, because a terminal does not access a malicious website directly, the terminal is secure, which can improve security of the terminal. In addition, in a solution that a non-executable preview interface of a malicious website is acquired by using a server, centralized management for non-executable preview interfaces of malicious websites may be achieved. In this way, there is no need to generate a non-executable preview interface each time when each terminal accesses a malicious website, which can improve utilization of system resources.

An embodiment of the present disclosure provides a malicious website access method. The method may be implemented in a server on a network side. Compared with the method provided by the embodiment illustrated in FIG. 2, the method further includes: receiving an identifier of a malicious website sent by a terminal.

A server may query a database by using the identifier of the malicious website sent by the terminal, to obtain a non-executable preview interface of the malicious website, and send the non-executable preview interface to the terminal.

Figure 3:
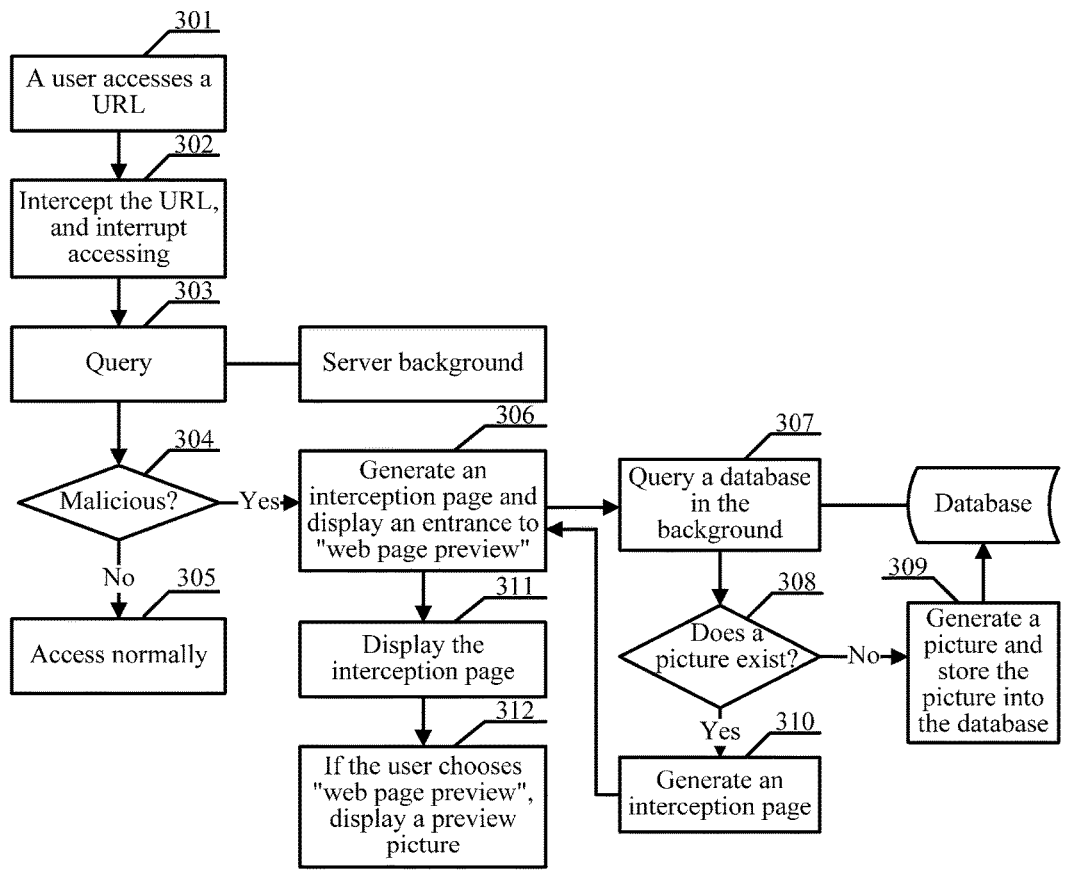
FIG. 3 is a schematic flowchart of a malicious website access method according to an embodiment of the present disclosure.

An embodiment of the present disclosure provides a malicious website access method. In this embodiment, an identifier of a website is a URL. Referring to FIG. 3, the method includes step 301 to step 312.

Step 301 may include accessing, by a user, a URL1.

Specifically, it may be that a user inputs a URL1 to a browser.

Step 302 may include Intercepting the URL1, and interrupt accessing.

In this step, the URL1 may be intercepted by using security software or hardware. Moreover, interrupting accessing aims to prevent a terminal of the user from downloading a web page of a malicious website.

Step 303 may include querying a background of the server. In this step, whether the URL1 corresponds to a malicious website may be queried.

In this step, if the URL1 is intercepted by using security software, whether the URL1 corresponds to a malicious website may be determined by querying a server background of the security software.

Step 304 may include determining whether the URL1 corresponds to a malicious website; if yes, proceeding to step 306; otherwise, proceeding to step 305.

Step 305 may include accessing the URL1 normally. It may be understood that, step 301 to this step belong to steps of accessing a normal website.

Step 306 may include generating an interception page and displaying an entrance to "web page preview"; and proceeding to 307.

In this step, the interception page is generated. On this interception page, an option of web page preview is displayed to a user. The user may choose to preview a web page, and may also close the interception page to end the process.

Step 307 may include querying a database in the background.

This step may include: sending the URL1 to the database, and querying, by using the URL1 as a keyword, a preview picture corresponding to the URL1.

Step 308 may include determining whether a preview picture exists, that is, whether there is a preview picture corresponding to the URL1; if not, proceeding to step 309; and if yes, proceeding to step 310.

Step 309 include generating, by using the URL1, a preview picture corresponding to the URL1, and storing the preview picture into the database.

It may be understood that, after the preview picture is stored into the database, in the next access, the preview picture may be found in the background database.

Step 310 may include generating, by using the preview picture, an interception page, generating an entrance to "web page preview" on the interception page; and proceeding to step 311.

Step 311 may include displaying the interception page.

Step 312 may include displaying, by the terminal of the user, the preview picture, if the user selects "web page preview" on the interception page. In this way, the user may view the web page of the malicious website.

In this embodiment, the user may view, by previewing a picture, information about a website to be accessed by the user. Moreover, because the terminal does not access a malicious website directly, the terminal is secure, which can improve security of the terminal.

In addition, in a solution that a preview picture of a malicious website is acquired by using a server, centralized management for preview pictures of malicious websites may be achieved. In this way, there is no need to generate a preview picture each time when each terminal accesses a malicious website, which can improve utilization of system resources.

Figure 4:
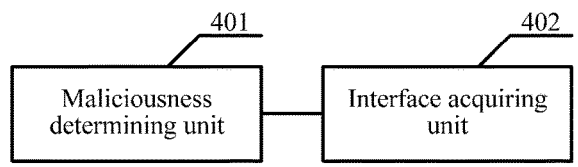
FIG. 4 is a schematic structural diagram of a malicious website access apparatus according to an embodiment of the present disclosure.

An embodiment of the present disclosure provides a malicious website access apparatus. As shown in FIG. 4, the apparatus may be located on a terminal, or may also be used as a part of a terminal, and the apparatus includes:

a maliciousness determining unit 401, configured to determine whether a website is a malicious website; and an interface acquiring unit 402, configured to acquire a non-executable preview interface of a web page of the malicious website if the maliciousness determining unit 401 determines that the website is a malicious website.

In this embodiment, a user may view, through a non-executable preview interface, information about a website to be accessed by the user. Moreover, because a terminal of the user does not access a malicious website directly, the terminal of the user is secure, which can improve security of the terminal of the user.

Figure 5:
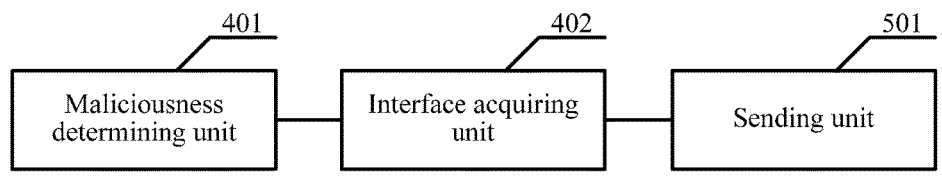
FIG. 5 is a schematic structural diagram of a malicious website access apparatus according to an embodiment of the present disclosure.

An embodiment of the present disclosure provides a malicious website access apparatus. As shown in FIG. 5, the apparatus and a terminal are located on a same side, and the apparatus includes:

a malicious website determining unit 401, configured to determine whether a website to be accessed by the terminal is a malicious website;

an interface acquiring unit 402, configured to acquire a non-executable preview interface of a web page of the malicious website if the malicious website determining unit 401 determines that the website is a malicious website; and a sending unit 501, configured to send the non-executable preview interface to the terminal for displaying.

Figure 6:
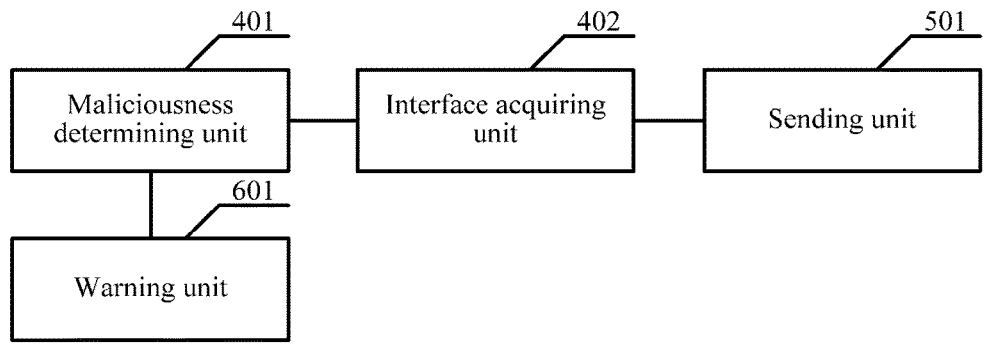
FIG. 6 is a schematic structural diagram of a malicious website access apparatus according to an embodiment of the present disclosure.

An embodiment of the present disclosure further provides a malicious website access apparatus. As shown in FIG. 6, the apparatus further includes:

a warning unit 601, configured to issue a warning that the website is a malicious website, if the maliciousness determining unit 401 determines that the website is a malicious website.

Figure 7:
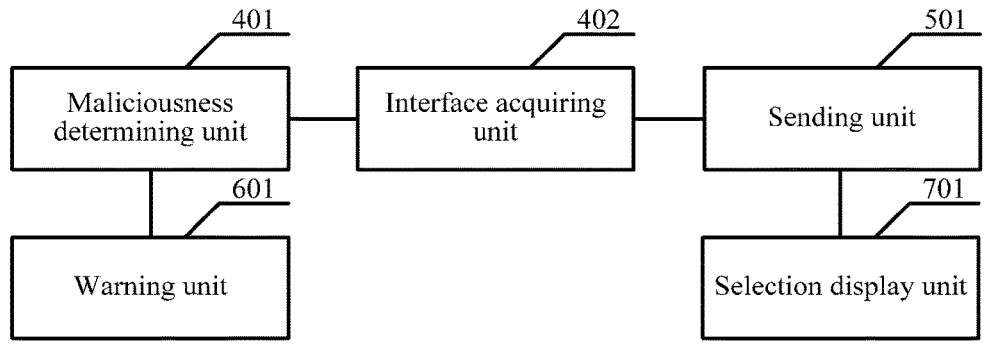
FIG. 7 is a schematic structural diagram of a malicious website access apparatus according to an embodiment of the present disclosure.

A malicious website access apparatus provided by an embodiment of the present disclosure further includes a solution that a user chooses whether to access the malicious website. As shown in FIG. 7, the apparatus further includes:

a selection display unit 701, configured to display selection keys of "stop accessing", "continue accessing", and "preview securely" when the warning unit 601 issues the warning that the website is a malicious website.

In this embodiment, the interface acquiring unit 402 is specifically configured to execute, if a user selects the "preview securely" in the selection display unit 701, the acquiring a non-executable preview interface of a web page of the malicious website.

Figure 8:
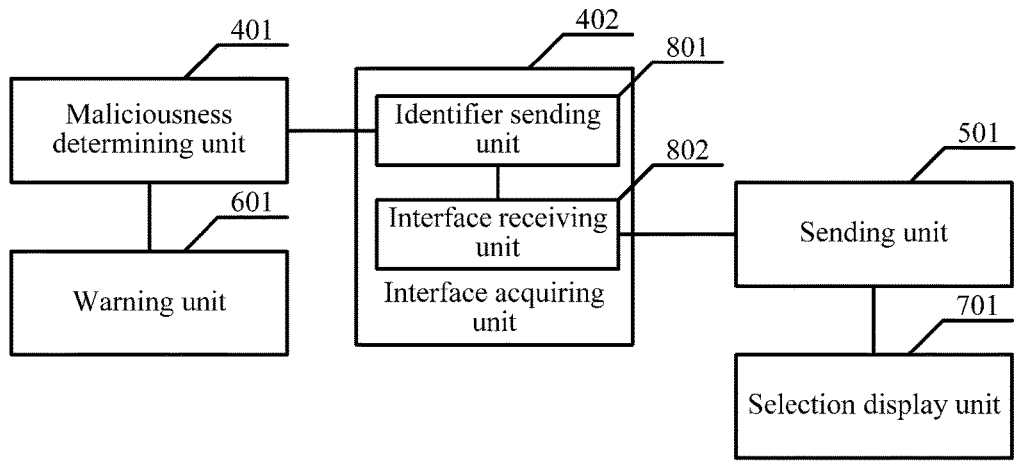
FIG. 8 is a schematic structural diagram of a malicious website access apparatus according to an embodiment of the present disclosure.

An embodiment of the present disclosure further provides an optional solution of acquiring a non-executable preview interface. As shown in FIG. 8, the interface acquiring unit 402 includes:

an identifier sending unit 801, configured to send an identifier of the malicious website to a server; and an interface receiving unit 802, configured to receive a non-executable preview interface corresponding to the identifier returned by the server.

In a solution that a non-executable preview interface of a malicious website is acquired by using a server, centralized management for non-executable preview interfaces of malicious websites may be achieved. In this way, there is no need to generate a non-executable preview interface each time when each terminal accesses a malicious website, which can improve utilization of system resources.

Figure 9:
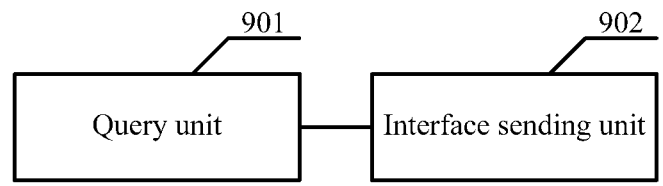
FIG. 9 is a schematic structural diagram of a malicious website access apparatus according to an embodiment of the present disclosure.

An embodiment of the present disclosure further provides a malicious website access apparatus. As shown in FIG. 9, the apparatus is located on a network side, and may be used as a server, and the apparatus includes:

a query unit 901, configured to query a database by using an identifier of a malicious website from a terminal, to obtain a non-executable preview interface of the malicious website; and an interface sending unit 902, configured to send the non-executable preview interface to the terminal.

By using the above solutions, a user may preview, through a non-executable preview interface, information about a website to be accessed by the user. Moreover, because a terminal does not access a malicious website directly, the terminal is not exposed to the malicious website, thereby enhancing security of the terminal. In addition, in a solution that a non-executable preview interface of a malicious website is acquired by using a server, centralized management for non-executable preview interfaces of malicious websites may be achieved. In this way, there is no need to generate a non-executable preview interface each time when each terminal accesses a malicious website, which can improve utilization of system resources.

Figure 10:
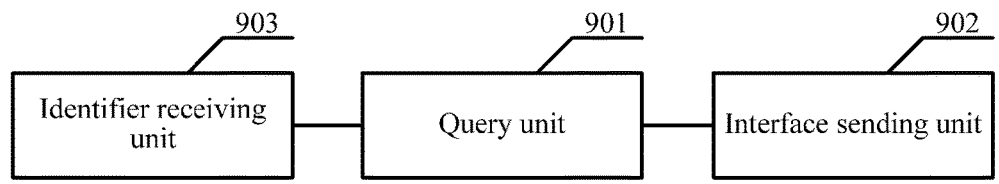
FIG. 10 is a schematic structural diagram of a malicious website access apparatus according to an embodiment of the present disclosure.

As shown in FIG. 10, an embodiment of the present disclosure further provides a malicious website access apparatus. Compared with the apparatus provided by the embodiment illustrated in FIG. 6, the apparatus further includes an identifier receiving unit 903, configured to receive an identifier of a malicious website sent by a terminal.

The query unit 901 may query a database according to the identifier of the malicious website received by the identifier receiving unit 903, so as to obtain a non-executable preview interface of the malicious website; and the interface sending unit 802 sends the non-executable preview interface to the terminal.

Figure 11:
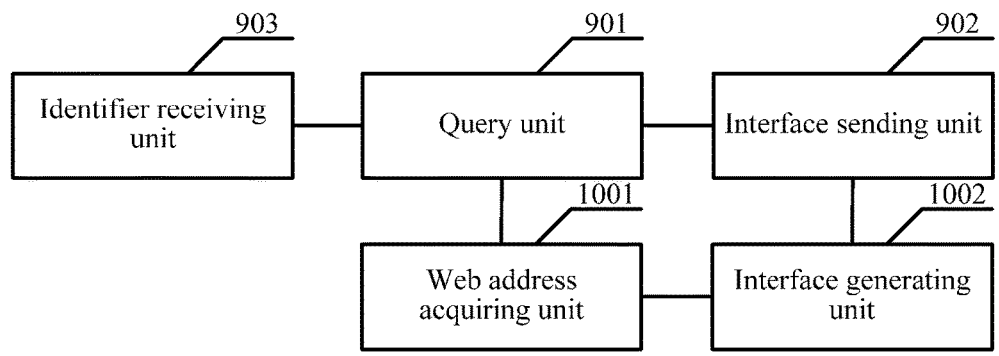
FIG. 11 is a schematic structural diagram of a malicious website access apparatus according to an embodiment of the present disclosure.

Further, because the database possibly does not include the non-executable preview interface of the malicious website, an embodiment of the present disclosure provides a malicious website access apparatus. As shown in FIG. 11, the apparatus further includes:

a web address acquiring unit 1001, configured to acquire a web address of the malicious website by using the identifier if there is no non-executable preview interface corresponding to the identifier in the database queried by the query unit 802; and an interface generating unit 1002, configured to generate, by using the web address acquired by the web address acquiring unit 1001, a non-executable preview interface corresponding to the website.

Figure 12:
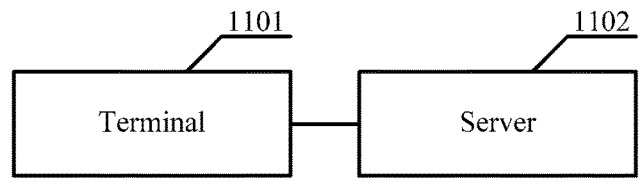
FIG. 12 is a schematic structural diagram of a malicious website access system according to an embodiment of the present disclosure.

As shown in FIG. 12, an embodiment of the present disclosure further provides a malicious website access system, including:

a terminal 1101 and a server 1102, where the terminal may be the apparatus provided by the embodiment illustrated in FIG. 4 of the present disclosure, and the server may be the apparatus provided by the embodiments illustrated in FIGS. 9, 10 and 11 of the present disclosure.

In this embodiment, a user may view, through a non-executable preview interface, information about a website to be accessed by the user. Moreover, because a terminal does not access a malicious website directly, the terminal is not exposed to the malicious website, thereby enhancing security of the terminal. In a solution that a non-executable preview interface of a malicious website is acquired by using a server, centralized management for non-executable preview interfaces of malicious websites may be achieved. In this way, there is no need to generate a non-executable preview interface each time when each terminal accesses a malicious website, which can improve utilization of system resources.

It should be noted that, the units included in the foregoing apparatus embodiments are merely divided according to functional logic. The units are not limited to the foregoing division as long as they can implement a corresponding function. In addition, specific names of functional units are also only for the convenience of differentiating each other, and are not intended to limit the protection scope of the present disclosure.

In addition, a person of ordinary skill in the art may understand that all or some of the steps of the foregoing method embodiments may be implemented by a program instructing relevant hardware. The corresponding program may be stored in a computer readable storage medium. The storage medium mentioned above may be a read-only memory, a magnetic disk, an optical disc, or the like.

The foregoing descriptions are merely specific implementation manners of the present disclosure, but are not intended to limit the protection scope of the present disclosure. Any variation or replacement readily figured out by a person skilled in the art within the technical scope disclosed in the embodiments of the present invention shall fall within the protection scope of the present disclosure. Therefore, the protection scope of the present disclosure shall be subject to the protection scope of the claims.

What is claimed is:

1. A malicious website access method, comprising:
    acquiring, by one or more processors, a URL of a website selected by a user to be accessed;
    determining, by the one or more processors, whether the website selected by the user to be accessed is a malicious website based on the URL;
    displaying, to the user, selection keys when the website is determined to be the malicious website, wherein the selection keys comprise a stop accessing key, a continue accessing key, and a preview securely key; and
    when the user selects the preview securely key,
        sending an identifier of the malicious website to a server, and
        receiving, by the one or more processors from the server and without downloading a web page of the malicious website, a non-executable preview image generated of the web page of the malicious website for display to the user, the non-executable preview image being identified by the server as corresponding to the identifier, wherein
    the non-executable preview image is a preview picture that is stored in the server for subsequent retrieval.

2. The method according to claim 1, when the website is is determined to be the malicious website, further comprising:
    issuing a warning that the website is the malicious website.

3. The method according to claim 1, wherein the identifier of the malicious website comprises information about a web address of the malicious website.

4. A malicious website access apparatus, comprising one or more processors and a memory having processor-executable instructions stored therein, and the instructions when executed by the one or more processors, configure the apparatus to:
    acquire a URL of a website selected by a user to be accessed;
    determine whether the website selected by the user to be accessed is a malicious website based on the URL;

display, to the user, selection keys when the website is determined to be the malicious website, wherein the selection keys comprise a stop accessing key, a continue accessing key and a preview securely key; and when the user selects the preview securely key,
send an identifier of the malicious website to a server, and
receive, from the server and without downloading a web page of the malicious website, a non-executable preview image generated of the web page of the malicious website for display to the user, the non-executable preview image being identified by the server as corresponding to the identifier, wherein the non-executable preview image is a preview picture that is stored in the server for subsequent retrieval.

5. The apparatus according to claim 4, wherein the apparatus is configured to:
issue a warning that the website is the malicious website, when the website is determined to be the malicious website.

6. The method according to claim 1, wherein
the server stores a different preview picture for each of a plurality of different malicious websites, and
the identifier is used by the server to identify which of the plurality of different preview pictures corresponds to the web page of the malicious website.

7. The apparatus according to claim 4, wherein
the server stores a different preview picture for each of a plurality of different malicious websites, and
the identifier is used by the server to identify which of the plurality of different preview pictures corresponds to the web page of the malicious website.

8. A non-transitory computer-readable storage medium storing instructions which when executed by a computer cause the computer to perform a malicious website access method, the method comprising:
acquiring a URL of a website selected by a user to be accessed;
determining whether the website selected by the user to be accessed is a malicious website based on the URL;
displaying, to the user, selection keys when the website is determined to be the malicious website, wherein the selection keys comprise a stop accessing key, a continue accessing key, and a preview securely key;
when the user selects the preview securely key,
sending an identifier of the malicious website to a server, and
receiving, by the one or more processors from the server and without downloading a web page of the malicious website, a non-executable preview image generated of the web page of the malicious website for display to the user, the non-executable preview image being identified by the server as corresponding to the identifier, wherein the non-executable preview interface is a preview picture that is stored in the server for subsequent retrieval.

9. The non-transitory computer-readable storage medium according to claim 8, wherein the method further comprises:
issuing a warning that the website is the malicious website when the website is determined to be the malicious website.

10. The non-transitory computer-readable storage medium according to claim 8, wherein the identifier of the malicious website comprises information about a web address of the malicious website.

11. The non-transitory computer-readable storage medium according to claim 8, wherein
the server stores a different preview picture for each of a plurality of different malicious websites, and
the identifier is used by the server to identify which of the plurality of different preview pictures corresponds to the web page of the malicious website.

12. The method according to claim 1, wherein the non-executable preview image of the web page of the malicious website is generated by the server.

\* \* \* \* \*